United States Patent
Kolar et al.

(10) Patent No.: US 6,377,482 B1
(45) Date of Patent: Apr. 23, 2002

(54) DEVICE AND METHOD FOR LINE-VOLTAGE DEPENDENT THYRISTOR CONTROLLED PRE-CHARGING OF OUTPUT CAPACITORS IN A THREE-LEVEL PULSE RECTIFIER SYSTEM

(75) Inventors: Johann W. Kolar, Vienna (AT); Wilhelm Korb, Monesee-Stockum (DE)

(73) Assignee: Ascom Energy Systems AG, Bern (CH)

( * ) Notice: Subject to any disclaimer, the term of this patent is extended or adjusted under 35 U.S.C. 154(b) by 0 days.

(21) Appl. No.: 09/743,922

(22) PCT Filed: May 17, 2000

(86) PCT No.: PCT/AT00/00134

§ 371 Date: May 4, 2001

§ 102(e) Date: May 4, 2001

(87) PCT Pub. No.: WO00/70735

PCT Pub. Date: Nov. 23, 2000

(30) Foreign Application Priority Data

May 17, 1999 (AU) .................................................. 870/99

(51) Int. Cl.$^7$ ........................... H02M 5/42; H02M 7/155
(52) U.S. Cl. ............................. 363/84; 363/85; 363/128
(58) Field of Search ............................. 363/84, 85, 86, 363/81, 125, 128

(56) References Cited

U.S. PATENT DOCUMENTS 4,447,695 A * 5/1984 Inoue ........................ 219/69 C
4,533,987 A * 8/1985 Tomofuji et al. ............. 363/36
4,939,381 A * 7/1990 Shibata et al. ............... 363/36
5,936,855 A * 8/1999 Salmon ........................ 363/46
6,061,256 A * 5/2000 Kolar ........................... 363/37

FOREIGN PATENT DOCUMENTS

| DE | 3234702 A1 | 3/1984 | .......... H02M/7/515 |
| DE | 3237488 A1 | 4/1984 | ............ H02M/1/06 |
| EP | 0660498 A2 | 6/1995 | .......... H02M/7/217 |
| JP | 09-201097 A | * 7/1997 | ............. H02P/9/04 |

* cited by examiner

*Primary Examiner*—Bao Q. Vu

(57) ABSTRACT

The invention relates to an apparatus for initial charging of the output capacitors of a three-phase three-point pulsed rectifier system. According to the invention, a thyristor is arranged in each phase between the input terminal and is connected in the current flow direction to the anode of the freewheeling diode, and an initial charging path is connected in parallel with this thyristor. The circuit for actuating the thyristor is activated after completion of the initial charging; the reference voltage is applied to the negative input of the comparator. When the potential profile which is present at the tap of the voltage divider at the input of the bridge path rises, the voltage at the positive comparator input slightly before the zero crossing of the mains voltage to positive values exceeds the reference voltage, thus initiating switching of the comparator output and/or actuation of the thyristor and, after the mean bridge branch input potential passes through zero, the actuation of the thyristor is suppressed once again. The thyristor is thus triggered only within that mains voltage half-cycle in which it is required for carrying the mains phase current.

3 Claims, 1 Drawing Sheet

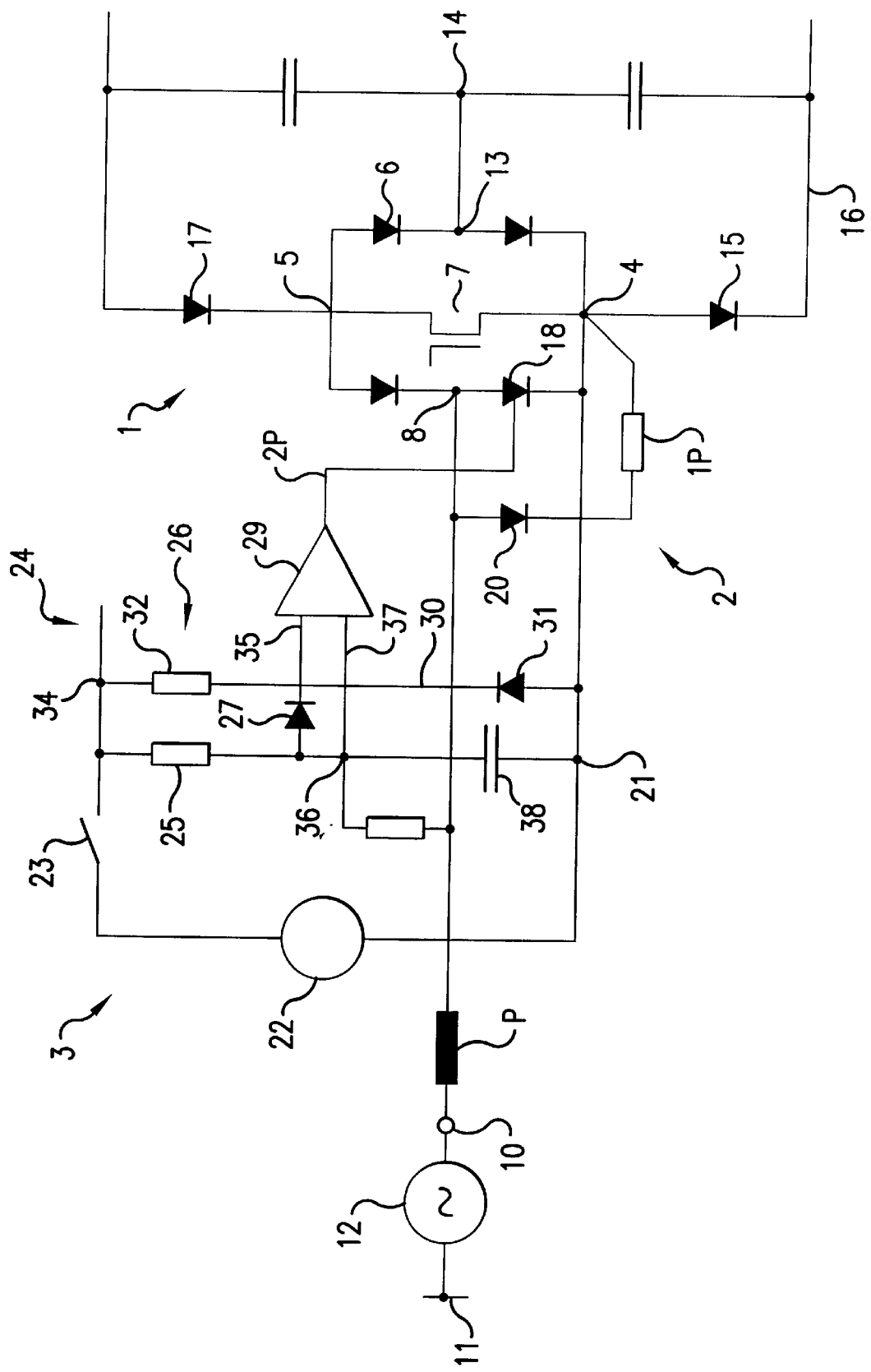

DEVICE AND METHOD FOR LINE-VOLTAGE DEPENDENT THYRISTOR CONTROLLED PRE-CHARGING OF OUTPUT CAPACITORS IN A THREE-LEVEL PULSE RECTIFIER SYSTEM

BACKGROUND OF THE INVENTION

1. Field of the Invention

The invention relates to an apparatus for initial charging of the output capacitors of a three-point pulsed rectifier system, and to a method and apparatus for controlling it.

2. Description of Related Art

According to the prior art, series resistors are inserted into the supply lines for initial charging of the output capacitors of pulsed rectifier systems, in particular in the circuit described in EP 94 120 245.9-1242 (A 2612/93), and are bridged by relay contacts once the output voltage has built up. Disadvantages of this solution are the space required for the initial charging device, the lack of reliability, and the limited life of mechanical contacts.

SUMMARY OF THE INVENTION

The object of the invention is thus to provide an initial charging apparatus and a method and an apparatus for controlling it, which initial charging apparatus is distinguished by a small space requirement and has no mechanical contacts.

The circuit described in EP 94 120 245.9-1242 (A 2612/93) for a three-point pulsed rectifier system has, in each phase, in each case one power transistor which is connected via the output terminals of a single-phase diode bridge. The first AC voltage input terminal of the diode bridge is connected via a series inductance to a mains voltage terminal, and the second AC voltage input terminal is connected directly to the capacitive center point of the output voltage.

Furthermore, that output terminal of the diode bridge, which is positive with respect to the polarity of the output voltage, is connected via a freewheeling diode to the positive output voltage rail, and the negative output voltage rail is connected via a further freewheeling diode to the negative output voltage terminal of the diode bridge.

The mains current flow which is produced by the input inductance, is generally sinusoidal and is in phase with the respective mains voltage which takes place continuously during one mains voltage or input current half-cycle via one of the input-side diodes of the single-phase bridge. The basic idea of the invention is now, in each phase, to replace the input diode, which is connected to the positive output terminal of the single-phase diode bridge, by a thyristor of the same polarity and to arrange, in parallel with this thyristor, a series circuit comprising a series resistor and a diode pointing in the current flow direction of the thyristor.

Since, owing to the total current which is forced to zero in the phases, a phase current in each case always has a positive mathematical sign, that is to say physically flows into the mains input terminal of a single-phase diode bridge, the inrush current is limited in each case by one series resistor when the rectifier system is started up. After the end of the initial charging process or after reaching a minimum output voltage value which is dependent on the mains voltage, the thyristors can be triggered by a higher-level control apparatus, and the phase initial charging devices can be bridged.

A major advantage of this apparatus, in addition to avoiding mechanical contact, is the capability to integrate the thyristors, and possibly also the initial charging diodes in modules which combine the power semiconductors of one phase, thus allowing the required heat-sink area and the external circuit complexity as well as the costs of the initial charging device to be minimized.

A method according to the invention for actuating the initial charging thyristors is described herein. In this case, after the end of the initial charging of the output circuit (as described above, derived from a voltage or time condition), the thyristor is triggered only within the positive mains voltage half-cycle. This is required for carrying the continuous input current with the triggering taking place shortly before the zero crossing of the phase voltage to positive values and thus being maintained until shortly after the zero crossing to negative values in order to ensure a continuous current flow taking account of the switching-frequency ripple of the input current.

Advantages over continuous triggering include the greater resistance of the thyristor to steep reverse-voltage changes occurring within the negative voltage half-cycle. Furthermore, if there is no gate current, the reverse currents of the thyristors and thus the reverse-flow losses are considerably reduced.

The reduction in the reverse-flow current is also a major factor with regard to the capability of the system to be operated in standby. A high reverse current results in the output capacitor that is connected between the output voltage center point and the negative output voltage rail which is discharged via the diode that faces from the output voltage center point to the cathode of the initial charging thyristor and thus interferes with the symmetry of the output voltages, which is essential for operation of the system, without any possibility of correction.

An advantageous apparatus for providing the actuation method is described herein.

The voltage supply for the actuation apparatus is in this case provided via a floating DC voltage source which is connected to the negative potential (also referred to in the following text as the reference-ground potential or ground) on the thyristor cathode. In each phase, this DC voltage source is connected by an electronically operated switch-on contact to the signal-processing section of the initial-charging device, which is formed by a voltage divider, a reference voltage generator and a comparator whose output is connected to the gate of the initial charging thyristor.

The reference voltage is tapped off, for example, from the cathode of a zener diode which is connected via a series resistor to the positive supply voltage, and is connected to the negative input of the comparator, with the anode of the zener diode being connected to ground.

Furthermore, a resistive voltage divider is arranged between the positive supply voltage rail and the mains-side input of the bridge path, and its tap is connected to the positive input of the comparator and is connected via a smoothing capacitor to ground and via a diode to the cathode of the zener diode in order to limit the voltage occurring at the positive comparator input.

Once the initial charging of the output circuit of the pulsed rectifier system has been completed, the actuation apparatus is activated by means of a higher-level control and monitoring device by closing the switch-on contact, thus applying the reference voltage to the negative comparator input.

If actuation of the power transistor is now enabled and the mean value with respect to time of the voltage (which has a discontinuous profile at the switching frequency) at the input of the bridge path rises corresponding to the mains voltage profile, ignoring the voltage drop at the fundamental frequency across the series inductance, the respective phase-voltage can be formed at the input with the exception of zero components, which do not influence the zero crossing, at the input of the bridge path and with the voltage divider between the positive supply voltage and the bridge path input being dimensioned appropriately. The voltage at the positive comparator input will exceed the reference voltage and thus initiate switching of the comparator output and/or actuation of the thyristor.

In a corresponding way, once the mean bridge path input voltage passes through 0, the actuation of the thyristor is suppressed once again, that is to say the thyristor is triggered in a corresponding manner only within that mains voltage half-cycle in which it is required in order to carry the input current.

BRIEF DESCRIPTION OF THE DRAWINGS

The invention will be explained in more detail in the following text with reference to an exemplary embodiment which is illustrated in the following figure, wherein:

FIG. 1 illustrates the basic structure of a phase modified of the power section of a three-phase three-point rectifier system according to the present invention.

DETAILED DESCRIPTION OF THE INVENTION

The invention will be explained in more detail in the following text with reference to an exemplary embodiment which is illustrated in FIG. 1, in which: FIG. 1 shows the basic structure (simplified, schematic illustration) of the control apparatus according to the invention and of the power section of the three-phase three-point pulsed rectifier system with an initial charging device, integrated according to the invention, for one phase.

FIG. 1 shows the basic structure of a phase 1, modified according to the invention, of the power section of a three-phase three-point pulsed rectifier system and an initial charging path 2, and the structure according to the invention for an actuation circuit 3 of the initial charging device, with the illustrated apparatus being used in the same form in each phase.

The phase bridge path 1 has a power transistor 7 which is connected between the positive output terminal 4 and the negative output terminal 5 of a single-phase diode bridge 6, with the first AC voltage input terminal 8 of the diode bridge being connected via a series inductance 9 to a mains voltage terminal 10, and the mains voltage 12, which is defined with respect to the mains star point 11, and the second AC voltage input terminal 13 of the diode bridge 6 being connected directly to the capacitive center point 14 of the output voltage.

Furthermore, that output terminal 4 of the diode bridge 6 which is positive with respect to the polarity of the output voltage is connected via a freewheeling diode 15 to the positive output voltage rail 16, and the negative output voltage rail is connected via a further freewheeling diode 17 to the negative output voltage terminal 5 of the diode bridge 6. Buffer capacitors are generally arranged between the positive output voltage rail 16 and the output voltage center point 14, and the output voltage center point and the negative output voltage rail.

The mains current flow, which is produced by the input inductance 9, is generally sinusoidal and is in phase with the respective mains voltage 12, takes place, provided the bridge paths of a mains voltage or input current half-cycle are configured conventionally, continuously via, in each case, one of the input-side diodes of the single-phase bridge 6. In a modification of the bridge paths according to the invention, the input diode, which is connected between the bridge path input terminal 8 and the positive output terminal 4 of the single-phase diode bridge 6, is replaced by a thyristor 18 of the same polarity and, in parallel with this thyristor, in order to arrange the initial charging path 2, comprising the series circuit formed by a series resistor 19 and a diode 20 pointing in the current flow direction of the thyristor.

Since the total current is forced to be 0, one phase current in each case has a positive mathematical sign, that is to say physically flows into the mains input terminal 8 of the single-phase diode bridge 6, which results in the inrush current being limited by in each case one initial charging resistor 19 in each phase when the rectifier system is started up.

After the end of the initial charging process and/or after reaching a minimum output voltage value which is dependent on the mains voltage, detected by a higher-level control or monitoring unit of the rectifier system, the initial charging path 2 is bridged by triggering the thyristor 18. In this case, the floating DC voltage source 22 which is connected to negative potential 21 (also referred to in the following text as reference ground potential or ground) on the thyristor cathode 4, is connected via the switch-on contact 23 to the signal-processing section 24 of the initial charging device.

This signal-processing section 24 is formed by a voltage divider 25, a reference voltage generator 26, a limiting diode 27 and a comparator 28, whose output is connected to the gate of the initial charging thyristor 18. The reference voltage is tapped off from the cathode 30 of a zener diode 31 which is connected via a series resistor 32 to the positive supply voltage rail 34, and is applied to the negative input 35 of the comparator 28, with the anode of the zener diode 31 being connected to ground 21.

Furthermore, a resistive voltage divider 25 is arranged between the positive supply voltage rail 34 and the mains-side input 8 of the bridge path 1, and its tap 35 is connected to the positive input 37 of the comparator 28 and, via a smoothing capacitor 38, to ground 21 and via the diode 27 in the forward direction to the cathode 30 of the zener diode 31, in order to limit the voltage occurring at the positive comparator input 37.

As already mentioned above, the actuation apparatus is activated by closing the switch-on contact 23 once the initial charging of the output circuit of the pulsed rectifier system has been completed, and this results in the reference voltage 30 being applied to the negative comparator input 35.

If the actuation of the power transistor 7 is now enabled by a higher-level control or monitoring unit and the mean value with respect to time of the potential, which has a discontinuous profile at the switching frequency, at the input 8 of the bridge path rises corresponding to the mains voltage profile 12 ignoring the voltage drop of the fundamental frequency across the series inductance 9, the respective mains phase voltage 12 occurs at the input of the bridge path 8, with the exception of zero components which do not influence the zero crossing And if the voltage divider 25 is dimensioned appropriately, the voltage at the positive comparator input shortly before the zero crossing of the mains voltage 12 will rise to positive values (positive potential at the mains terminal 10 with respect to the star point 11), and will exceed the reference voltage 30, thus initiating switching of the comparator output 29 and/or actuation of the thyristor 18.

In a corresponding way, once the mean bridge path input voltage has passed through 0, actuation of the thyristor 18 is suppressed once again, that is to say, ignoring minor overlaps which ensure the continuous profile of the input current at the zero crossing, the thyristor 16 is advantageously triggered, only within that mains voltage half-cycle in which it is required in order to carry the mains phase current produced by the input inductance 9.

What is claimed is:

1. Apparatus for initial charging of the output capacitors of a three-phase, three-point pulsed rectifier system which has, in a conventional configuration in each phase, a single-phase diode bridge, a power transistor, a series inductance and freewheeling diodes, characterized in that, in each phase, that diode in the single-phase diode bridge which is connected on the anode side to the input terminal and on the cathode side to the anode of the freewheeling diode connected to the positive output voltage rail in the current flow direction is replaced by a thyristor of the same polarity and, arranged in parallel with this thyristor, an initial charging path, comprising a series circuit formed by a series resistor and a diode, pointing in the same current flow direction as the thyristor.

2. Method for controlling the initial charging apparatus according to claim 1, wherein after initial charging of the output circuit, as derived by a higher-level control or monitoring unit in a manner known per se from a voltage or time condition, the thyristor is triggered only within the positive mains voltage half-cycle, that is to say when the mains voltage terminal is at a higher potential than the mains star point, within which half-cycle it is required for carrying the continuous input current produced by the associated input inductance, with the triggering actually taking place slightly before the zero crossing of the phase voltage to positive values and is maintained until shortly after the zero crossing to negative values in order to ensure a continuous current flow taking into account the switching-frequency ripple on the input current into the inductance.

3. Apparatus for carrying out the method according to claim 2, wherein in each phase, a floating DC supply voltage, which is connected to the negative potential or to ground on the thyristor cathode, is connected via a switch-on contact to the signal-processing part of the initial charging device, which part is formed by a voltage divider, a reference voltage generator, a limiting diode and a comparator whose output is connected to the gate of the initial charging thyristor, with the reference voltage being tapped off from the cathode of a zener diode which is connected via a series resistor to the positive supply voltage rail, and being connected to the negative input of the comparator, with the anode of the zener diode being connected to ground and, furthermore, with a resistive voltage divider being arranged between the positive supply voltage rail and the mains-side input of the bridge path, the tap of which resistive voltage divider is connected to the positive input of the comparator and, via a smoothing capacitor to ground and, in order to limit the voltage which occurs at the positive comparator input, being connected via the diode in the current flow direction to the anode of the zener diode, with the actuation apparatus being activated by closing of the switch-on contact after completion of the initial charging of the output circuit of the pulsed rectifier system, detected by a higher-level control or monitoring apparatus, and the reference voltage being applied to the negative comparator input and thus the voltage at the positive comparator input shortly before the zero crossing of the mains voltage to positive values exceeding the reference voltage when the potential profile, which is present at the tap of the voltage divider and whose switching-frequency changes are smoothed by the capacitor, at the input of the bridge path rises, and assuming that the voltage divider is dimensioned appropriately, and, in consequence, switching of the comparator output and/or actuation of the thyristor being triggered and, in a corresponding manner, once the mean bridge branch input potential or the mains phase voltage, whose profile is largely identical with the exception of zero components, passes through 0, the actuation of the thyristor is suppressed once again, and thus, ignoring minor overlaps which ensure the continuous profile of the input current at the zero crossing, the thyristor is triggered only within those mains voltage half-cycles within which it is required in order to carry the mains phase current produced by the input inductance.

* * * * *